(12) United States Patent
Miyamae

(10) Patent No.: US 10,236,773 B2
(45) Date of Patent: Mar. 19, 2019

(54) LOW QUIESCENT CURRENT DC-TO-DC CONVERTER WITH INCREASED OUTPUT VOLTAGE ACCURACY

(71) Applicant: Cypress Semiconductor Corporation, San Jose, CA (US)

(72) Inventor: Toru Miyamae, Aichi (JP)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/596,762

(22) Filed: May 16, 2017

(65) Prior Publication Data

US 2018/0097445 A1    Apr. 5, 2018

Related U.S. Application Data

(60) Provisional application No. 62/402,485, filed on Sep. 30, 2016.

(51) Int. Cl.
| | | |
|---|---|---|
| *H02M 1/08* | (2006.01) | |
| *H02M 3/157* | (2006.01) | |
| *H02M 3/158* | (2006.01) | |
| *H02M 3/156* | (2006.01) | |
| *H02M 1/00* | (2006.01) | |

(52) U.S. Cl.
CPC ......... *H02M 3/157* (2013.01); *H02M 3/1563* (2013.01); *H02M 1/08* (2013.01); *H02M 3/156* (2013.01); *H02M 3/158* (2013.01); *H02M 2001/0025* (2013.01); *H02M 2001/0035* (2013.01)

(58) Field of Classification Search
CPC .... H02M 3/156; H02M 3/158; H02M 3/1563; H02M 1/08; H02M 2001/0025; H02M 2001/0035; H02M 3/157
See application file for complete search history.

(56) References Cited

U.S. PATENT DOCUMENTS

| 6,188,206 | B1* | 2/2001 | Nguyen | .............. H02M 3/1563 |
|---|---|---|---|---|
| | | | | 323/222 |
| 7,382,114 | B2 | 6/2008 | Groom | |
| 7,528,587 | B2 | 5/2009 | Wu et al. | |
| 7,679,450 | B2 | 3/2010 | Goh | |
| 7,986,499 | B2 | 7/2011 | Wang et al. | |
| 7,990,126 | B1 | 8/2011 | Zhang et al. | |

(Continued)

FOREIGN PATENT DOCUMENTS

EP    1604422 A2    12/2005

OTHER PUBLICATIONS

C. T. Tsai and H. P. Chou, "A synthetic ripple buck converter with dynamic hysteretic band modulation," 2009 International Conference on Power Electronics and Drive Systems (PEDS), Taipei, 2009, pp. 170-174.*

(Continued)

*Primary Examiner* — Jue Zhang
*Assistant Examiner* — Jye-June Lee

(57) ABSTRACT

Systems and methods for driving a low quiescent current DCDC converter are disclosed. An error threshold compensation circuit of the DCDC converter is configured to detect an output voltage of the DCDC converter, compare the output voltage to a target voltage, and modify a first threshold voltage of the hysteresis control circuit based on the comparison.

20 Claims, 12 Drawing Sheets

(56) References Cited

U.S. PATENT DOCUMENTS

| | | | |
|---|---|---|---|
| 8,008,902 B2* | 8/2011 | Melanson | H02M 3/1563 |
| | | | 323/285 |
| 8,335,097 B2 | 12/2012 | Yamashita | |
| 8,339,116 B2 | 12/2012 | Huang et al. | |
| 8,710,810 B1 | 4/2014 | McJimsey et al. | |
| 8,766,615 B2 | 7/2014 | Nishida et al. | |
| 8,773,083 B2 | 7/2014 | Martin et al. | |
| 8,912,778 B1 | 12/2014 | Bennett et al. | |
| 8,928,299 B2 | 1/2015 | Matzberger et al. | |
| 8,970,199 B2 | 3/2015 | Scoones et al. | |
| 9,048,728 B2 | 6/2015 | Parthasarathy et al. | |
| 9,134,744 B2 | 9/2015 | Nork | |
| 9,264,033 B2* | 2/2016 | Mukherjee | H02M 3/1563 |
| 9,318,954 B2 | 4/2016 | Le-Hung et al. | |
| 9,362,828 B2 | 6/2016 | Peker et al. | |
| 9,391,516 B2* | 7/2016 | Bai | H02M 3/158 |
| 9,419,516 B2 | 8/2016 | Philip | |
| 2008/0224672 A1 | 9/2008 | Trochut | |
| 2009/0160422 A1* | 6/2009 | Isobe | H02M 3/156 |
| | | | 323/349 |
| 2011/0018507 A1 | 1/2011 | McCloy-Stevens et al. | |
| 2013/0278059 A1 | 10/2013 | Liu et al. | |
| 2015/0207404 A1 | 7/2015 | Philip | |
| 2015/0326102 A1 | 11/2015 | Radhakrishnan et al. | |
| 2016/0306371 A1* | 10/2016 | Svorc | H02M 3/1588 |
| 2017/0085180 A1* | 3/2017 | Pulici | H02M 3/156 |

OTHER PUBLICATIONS

"10μA Quiescent Current High Efficiency Step-Down DCDC Controller" Linear Technology Corporation, pp. 1-16; 16 pages.

"2A Low Quiescent Current 1MHz High Efficiency Synchronous Buck Regulator" Intersil, Dec. 1, 2011, pp. 1-17; 17 pages.

"LM2619 500mA Sub-Miniature Step-Down DC-DC Converter" National Semiconductor, Oct. 2003, pp. 1-15, 15 pages.

"TPS62125 3-V to 17-V, 300-mA Step-Down Converter With Adjustable Enable Threshold and Hysteresis" Texas Instrument, May 2017, pp. 1-37; 37 pages.

Written Opinion of the International Searching Authority for International Application No. PCT/US17/034448 dated Aug. 7, 2017; 11 pages.

* cited by examiner

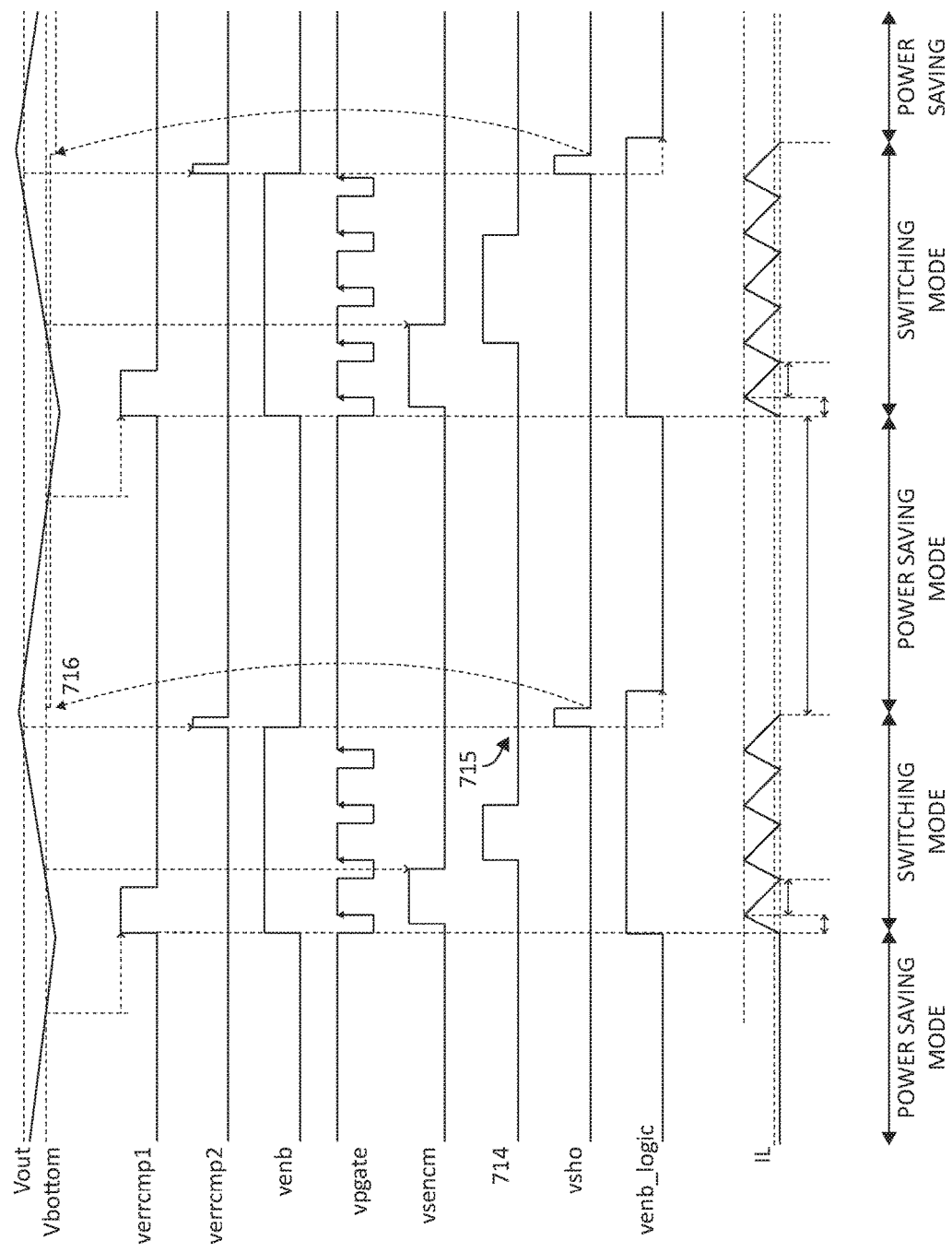

LOW QUIESCENT CURRENT DC-TO-DC CONVERTER WITH INCREASED OUTPUT VOLTAGE ACCURACY

RELATED APPLICATIONS

This application claims the benefit of U.S. Provisional Application No. 62/402,485, filed on Sep. 30, 2016, the entire contents of which are incorporated by reference herein.

BACKGROUND

A direct current to direct current (DCDC) converter (also referred to as a DC-to-DC converter, DC/DC converter, etc.) is an electronic circuit or electromechanical device that converts a source of direct current (DC) from one voltage level to another. It is one type of electric power converter. Power levels operated on by a DCDC converter range from very low (e.g., small batteries) to very high (e.g., high-voltage power transmission).

BRIEF DESCRIPTION OF THE DRAWINGS

The present disclosure is illustrated by way of example, and not of limitation, in the figures of the accompanying drawings in which:

FIG. 7B is a timing diagram illustrating operation of the second embodiment of an error threshold compensation circuit of a low quiescent current DCDC converter, according to an embodiment.

DETAILED DESCRIPTION

DCDC converters may be used to increase or decrease direct current (DC) voltages to correspond to a given application. DCDC converters output a modified voltage to a designated load (e.g., a processing device, a memory, etc.). Various types of DCDC converters may exist. In one embodiment, a linear DCDC converter may be used to decrease an input voltage to generate a smaller output voltage. Linear DCDC converters may be simple to produce but are unable to increase an input voltage to generate a higher output voltage. This may render them unsuitable in many situations.

In another embodiment, switching DCDC converters may increase and decrease an input voltage to generate a smaller or larger output voltage. Switching regulators may be complicated to produce and may suffer from low efficiency when they are not driving a high load. When the load of a switching DCDC converter is small (e.g., have a low load current) DCDC converters may have a high quiescent current (IQ).

In one embodiment, IQ is the current consumed by a circuit when the circuit is in a quiescent state. A circuit may be in a quiescent state when the circuit is not driving a load (or driving a small load) and not cycling (e.g., when the circuit is in a power saving mode, suspended mode, etc.). High IQ may be detrimental due to excess power waste.

In one embodiment, DCDC converters may utilize hysteresis control circuits to lower IQ of the converter. A hysteresis control circuit may filter signals so that the output reacts less rapidly than it otherwise would. By reducing reaction time to small changes in a DCDC circuit, the IQ of the DCDC circuit may be reduced. In one embodiment, low IQ DCDC converters utilizing a hysteresis control circuit may suffer from reduced accuracy of the output voltage.

Embodiments of the present disclosure provide a low IQ DCDC converter with increased output voltage accuracy. In one embodiment, a low IQ DCDC converter includes a hysteresis control circuit, a switching circuit operatively coupled to the hysteresis control circuit, and an error threshold compensation circuit operatively coupled to the hysteresis control circuit and to the switching circuit. The error threshold compensation circuit may be configured to: detect an output voltage of the DCDC converter; compare the output voltage to a target voltage; and modify a first threshold voltage of the hysteresis control circuit based on the comparison.

Figure 1:
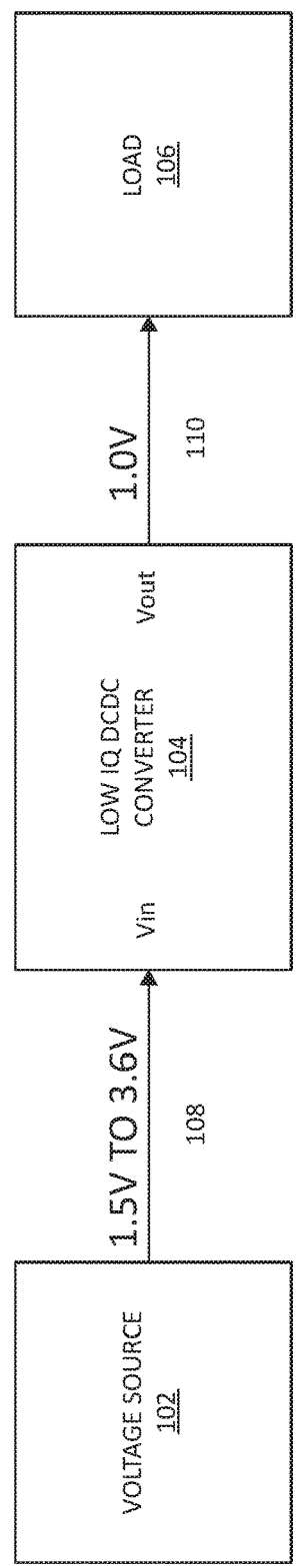
FIG. 1 is a block diagram illustrating a system including a low quiescent current DCDC converter, according to an embodiment.

FIG. 1 is a block diagram illustrating a system 100 including a low quiescent current DCDC converter, according to an embodiment.

System 100 may include a DC voltage source 102 (e.g., a battery). DCDC voltage source may be a power supply. In one embodiment, the voltage source 102 may provide a steady input voltage 108 to the system 100. In one embodiment, the input voltage 108 may be 1.5V to 3.6V. In another embodiment, the input voltage 108 may be up to 5V. In another embodiment, the input voltage 108 may be less than 1.5V or greater than 5V.

System 100 may also include a load 106. In one embodiment, load 106 is a processing device. The processing device may reside on a common carrier substrate such as, for example, an integrated circuit ("IC") die substrate, a multichip module substrate, or the like. Alternatively, the components of the processing device may be one or more separate integrated circuits and/or discrete components. In one exemplary embodiment, the processing device is a device from the Programmable System on a Chip (PSoC®) family of devices, developed by Cypress Semiconductor Corporation, San Jose, Calif. Alternatively, the processing device may be one or more other processing devices such as a microprocessor or central processing unit, a controller, special-purpose processor, digital signal processor ("DSP"), an application specific integrated circuit ("ASIC"), a field programmable gate array ("FPGA"), or the like.

In another embodiment, load 106 is a memory device. The memory device may include a memory array, which may be organized as rows and columns of non-volatile memory cells. The memory array may be coupled to address drivers via multiple select lines and read lines. For example, there may be one select line and one read line for each row of the memory array. The address drivers may drive memory locations corresponding to addresses received over an address bus. For example, address decoders may include a row decoder, a column decoder, and a sector decoder to decode addresses received from the processing device. In another embodiment, load 106 may be any device powered by the system 100. In one embodiment, load 106 may utilize a voltage that is different than the input voltage 108 provided by the voltage source 102 of system 100.

System 100 may include a low IQ DCDC converter 104, operatively coupled to the voltage source 102 and the load 106. Low IQ DCDC converter may receive input voltage 108 from voltage source 102 and generate output voltage 110 to drive load 106. Low IQ DCDC converter 104 may be configured to perform low IQ DCDC converter operations to reduce IQ and increase the accuracy of output voltage 110, as described herein.

Figure 2:
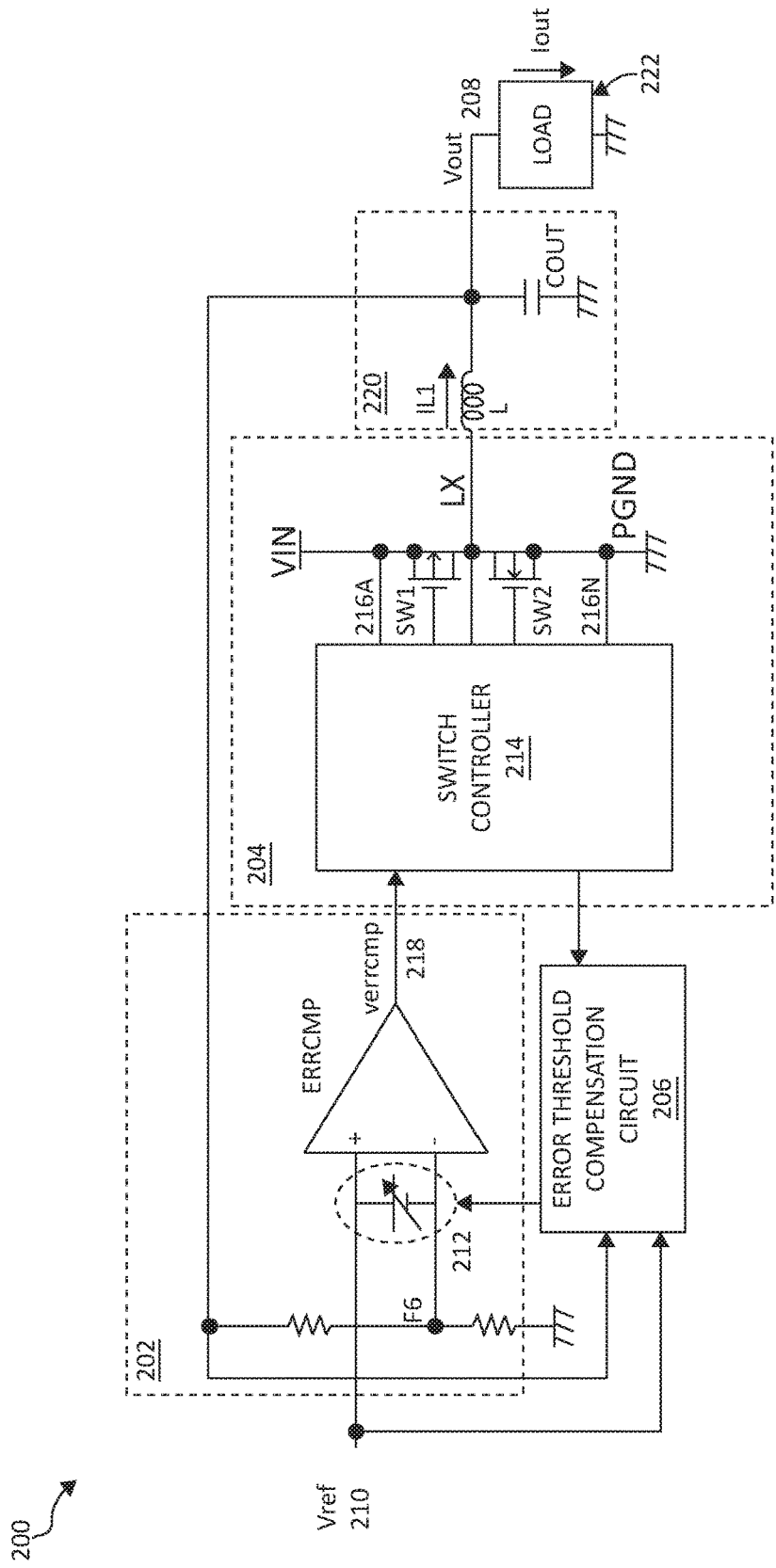
FIG. 2 is a block diagram illustrating circuitry of a low quiescent current DCDC converter, according to an embodiment.

FIG. 2 is a block diagram illustrating circuitry 200 of a low quiescent current DCDC converter, according to an embodiment. Circuitry 200 may include a hysteresis control circuit 202, a switching control circuit 204, and an error threshold compensation circuit 206. In one embodiment, error threshold compensation circuit 206 is configured to detect DCDC output voltage 208, compare the output voltage 208 to a target voltage (e.g., Vref 210), and modify a threshold voltage 212 of the hysteresis control circuit 202 based on the comparison.

In one embodiment, switching circuit 204 may include a switch controller 214 and switches 216A-N. Switching circuit may be configured to perform switching cycles in a switching mode when switch controller 214 is enabled (e.g., from enable signal 218). In one embodiment, one switching cycle includes enabling a first switch 216A while disabling a second switch 216N for a first time period or duration of time, and disabling the first switch 216A while enabling the second switch 216N for a second time period or duration of time. Switching circuit may continually perform switching cycles while in switching mode. When enable signal 218 disables switch controller 214, switching mode may be disabled and circuitry 200 may enter a power saving mode.

Circuitry 200 may include and a filter circuit (e.g., LC filter circuit 220) to store energy in the DCDC converter circuitry 200 and filter noise from the output voltage 208. In one embodiment, the output voltage 208 may drive a load 222. Load 222 may be a processing device, a memory device, or any other electronic device configured to utilize output voltage 208.

Figure 3:
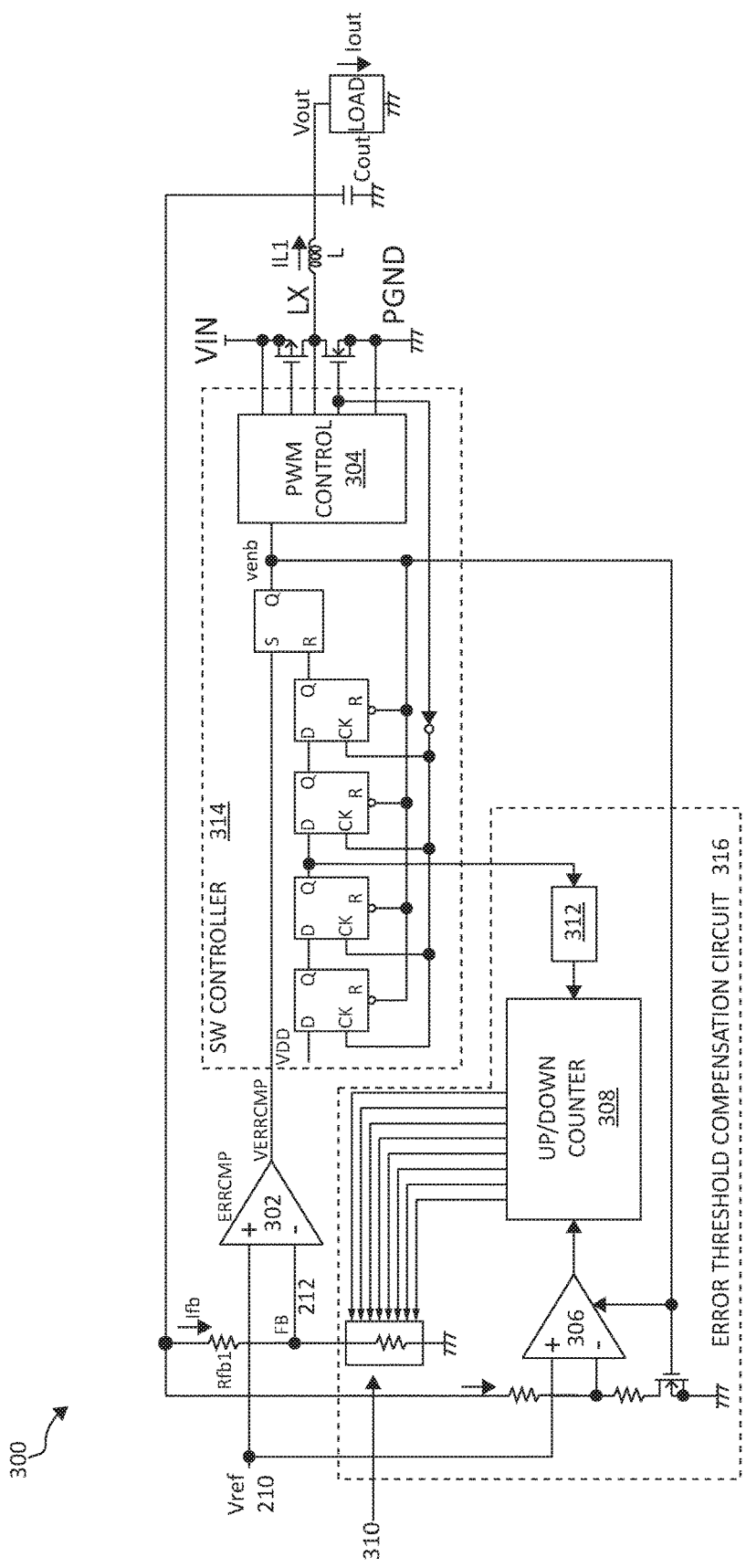
FIG. 3 is a block diagram illustrating a first embodiment of an error threshold compensation circuit of a low quiescent current DCDC converter, according to an embodiment.

FIG. 3 is a block diagram illustrating a first example embodiment of a circuit 300 of an error threshold compensation circuit 316 of a low quiescent current DCDC converter. Error threshold compensation circuit 316 may be one embodiment of error threshold compensation circuit 206 of FIG. 2. In one embodiment, comparator 302 compares a threshold voltage (e.g., Vref 210) to the output voltage 208 to determine when the output voltage 208 drops below the threshold voltage. In one embodiment, the threshold voltage is a bottom threshold voltage of the comparator 302. When the output voltage 208 drops below the threshold voltage, comparator 302 enables switch controller 314. Switch controller 314 may be one embodiment of switch controller 214 of FIG. 2.

Switch controller 314 may include various d-latches, s-latches, and pulse width modulation (PWM) controller 304. In one embodiment, PWM controller 304 is configured to perform a series of switching cycles to increase output voltage 208. In one embodiment, after two switching cycles, comparator 306 may compare output voltage 208 to the target voltage (e.g., Vref 210). In one embodiment, the DCDC converter is configured to modify the output voltage to match the target voltage.

In one embodiment, if the output voltage 208 is less than the target voltage based on the comparison, comparator 306 is configured to cause the up/down counter 308 to increase a counter and modify a resistance value of a trimming circuit (e.g., variable resistor 310) accordingly. By modifying a resistance value of variable resistor 310, error threshold compensation circuit 316 may increase the threshold voltage of the hysteresis control circuit (e.g., at comparator 302) when the output voltage is less than the target voltage. In another embodiment, if the output voltage 208 is greater than or equal to the target voltage based on the comparison, comparator 306 is configured to cause the up/down counter 308 to decrease a counter and modify the resistance value of variable resistor 310 accordingly. By modifying the resistance value of variable resistor 310, error threshold compensation circuit 316 may decrease the threshold voltage of the hysteresis control circuit (e.g., at comparator 302) when the output voltage is greater than or equal to the target voltage.

In one embodiment, one-shot circuit 312 may be used to cause the up/down counter 308 to read in the value of comparator 306 after at least two switching cycles. In one embodiment, switch controller 314 may end the switching mode after four switching cycles.

Figure 4A:
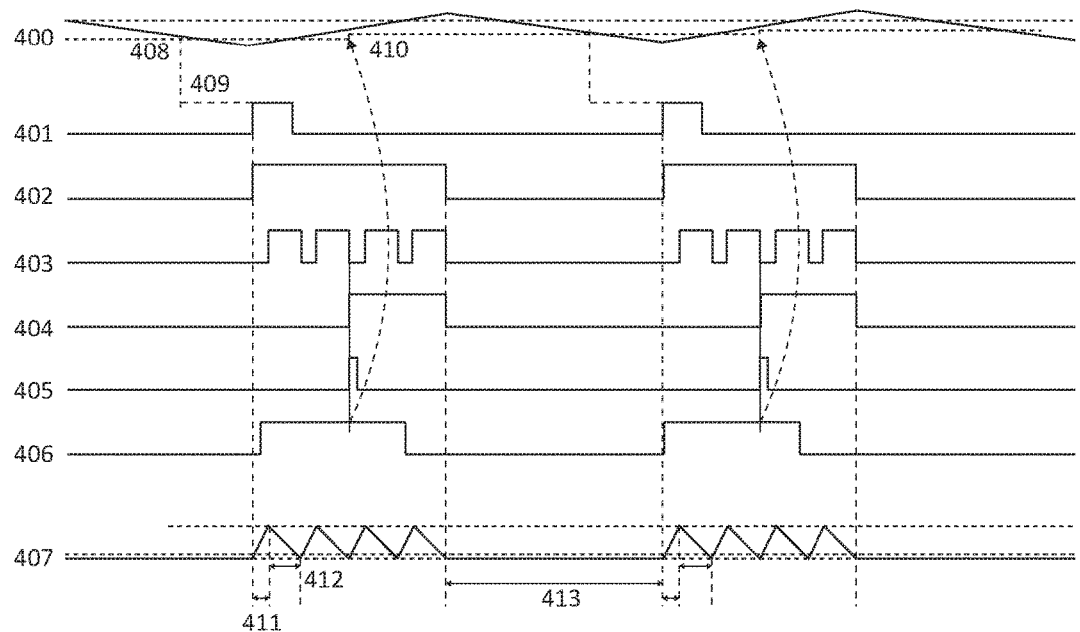
FIG. 4A is a timing diagram illustrating operation of the first embodiment of an error threshold compensation circuit of a low quiescent current DCDC converter, according to an embodiment.

FIG. 4A is a timing diagram illustrating operation of the first example embodiment of an error threshold compensation circuit of a low quiescent current DCDC converter. In one embodiment, the timing diagram of FIG. 4A corresponds to circuit 300 of FIG. 3. In the example of FIG. 4A output voltage 400 is detected to reach a threshold (e.g., a bottom threshold value of a comparator in a hysteresis circuit) at 408. There may be some delay 409 before the comparator sends an enable signal 401 to the switching circuit (e.g., to a PWM controller). PWM controller logic 402 may reach a logical high value in response to 401 and enable a switching mode causing switches to cycle 403. After two switching cycles, switching circuit may cause a logical high signal 404 to be sent to a one-shot circuit, where the one-shot signal 405 pulses to enable an up/down counter to read in the output 406 of a comparator of the error threshold compensation circuit.

In this example, the output 406 of the error threshold compensation comparator is a logical high when read by the up/down counter, so the up/down counter increases the threshold voltage 410. Signal 407 of FIG. 4A represents current over an inductor of an LC circuit in the DCDC converter. During a first portion 411 of a switching cycle, signal 407 increases while a first switch is enabled and a second switch is disabled. During a second portion 412 of the switching cycle, 407 decreases while the first switch is disabled and the second switch is enabled. After a threshold number of switching cycles have been performed, current 407 remains dormant while the switching circuit is in a power saving mode.

Figure 4B:
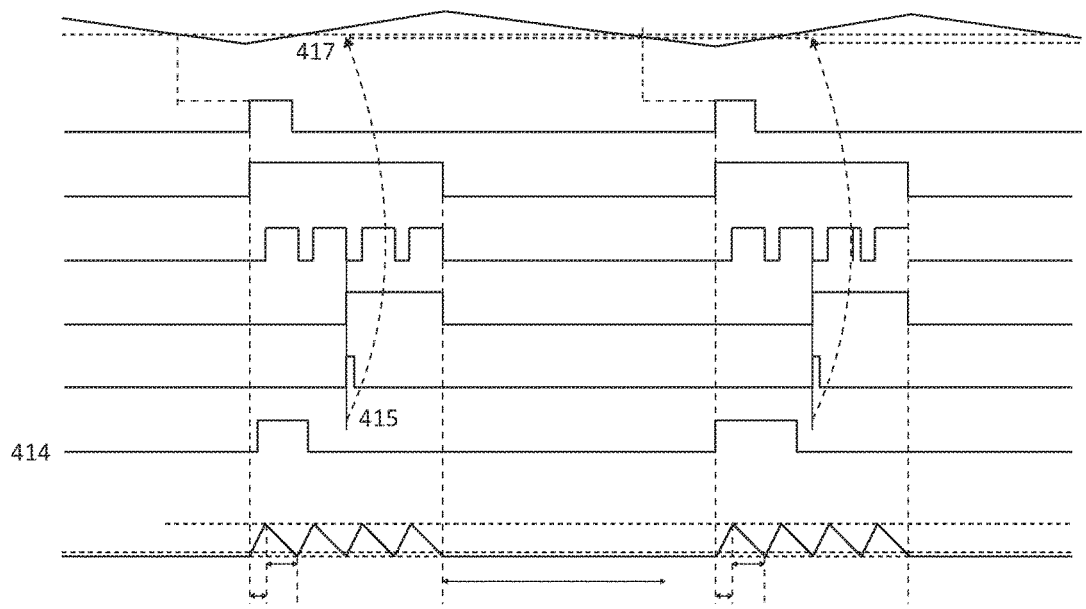
FIG. 4B is a timing diagram illustrating operation of the first embodiment of an error threshold compensation circuit of a low quiescent current DCDC converter, according to an embodiment.

FIG. 4B is a timing diagram illustrating operation of the first embodiment of an error threshold compensation circuit of a low quiescent current DCDC converter. In one embodiment, the timing diagram of FIG. 4B corresponds to circuit 300 of FIG. 3. In FIG. 4B, the output 414 of the error threshold compensation comparator is a logical low 415 when read by the up/down counter, so the up/down counter decreases the threshold voltage 417.

Figure 5:
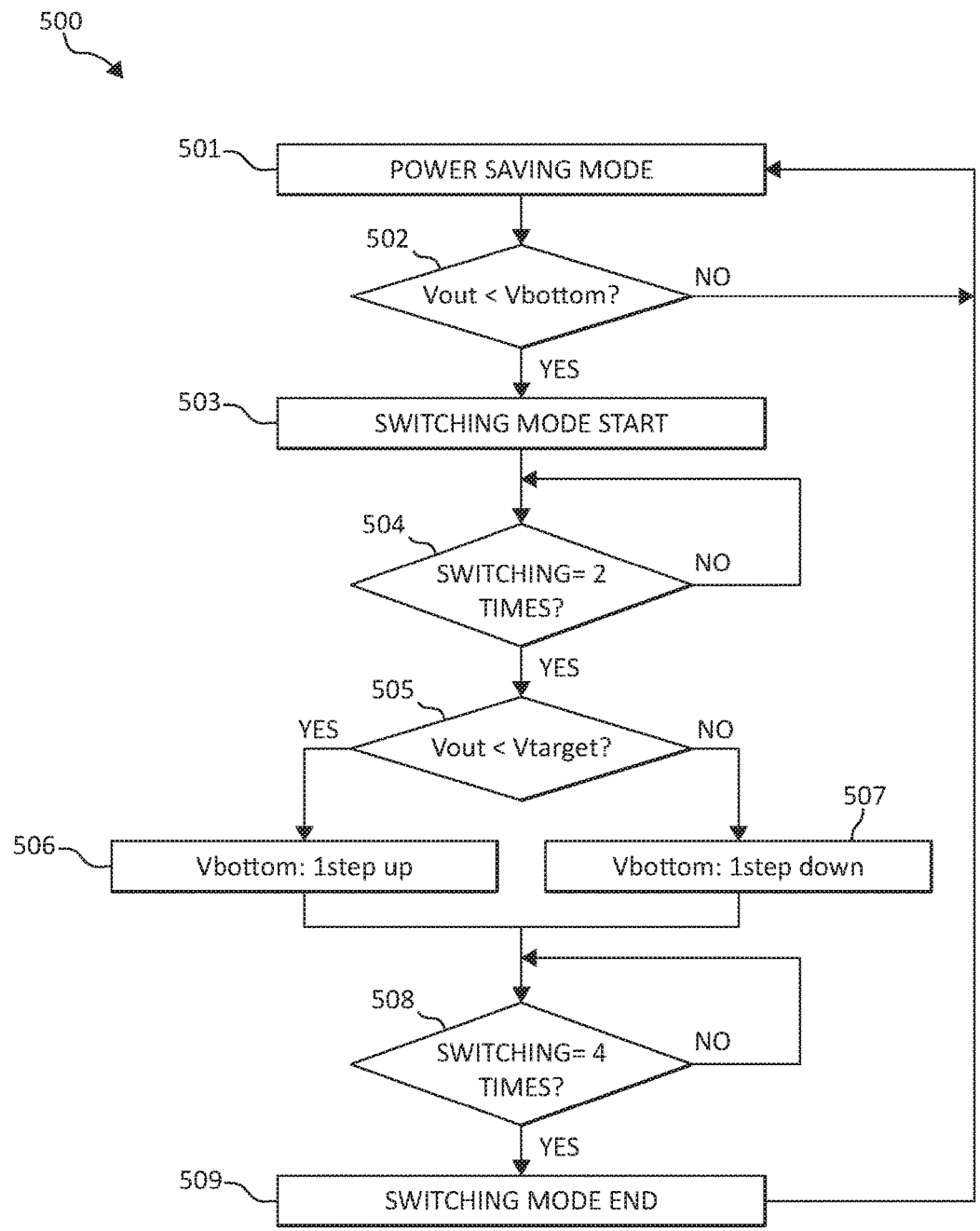
FIG. 5 is a flow diagram of processes of a low quiescent current DCDC converter, according to an embodiment.

FIG. 5 is a flow diagram of processes of a low quiescent current DCDC converter, according to an embodiment. In one embodiment, the flow diagram of FIG. 5 corresponds to circuit 300 of FIG. 3. In one embodiment, a DCDC converter begins in a power saving mode 501. At block 502 the error threshold compensating circuit determines whether an output voltage of a DCDC converter is below a threshold voltage of the DCDC converter. If yes, at block 503, the error threshold compensating circuit initializes a switching mode of the DCDC converter and performs at least two switching cycles in the switching mode of the DCDC converter (block 504). In another embodiment, any number of switching cycles may be performed at block 504. After at least two cycles, the error threshold compensating circuit may compare 505 the output voltage to a target voltage of the DCDC converter and modify the threshold voltage of the DCDC converter based on the comparing the output voltage to the target voltage.

In one embodiment, if the output voltage is less that the target voltage, the error threshold compensating circuit increases 506 the threshold voltage. In another embodiment, if the output voltage is greater than or equal to the target voltage, the error threshold compensating circuit decreases 507 the threshold voltage. After four switching cycles have been performed at block 508, the DCDC converter may end switching mode 509 and enter power saving mode 501. In another embodiment, any number of switching cycles may be performed at block 508.

Figure 6:
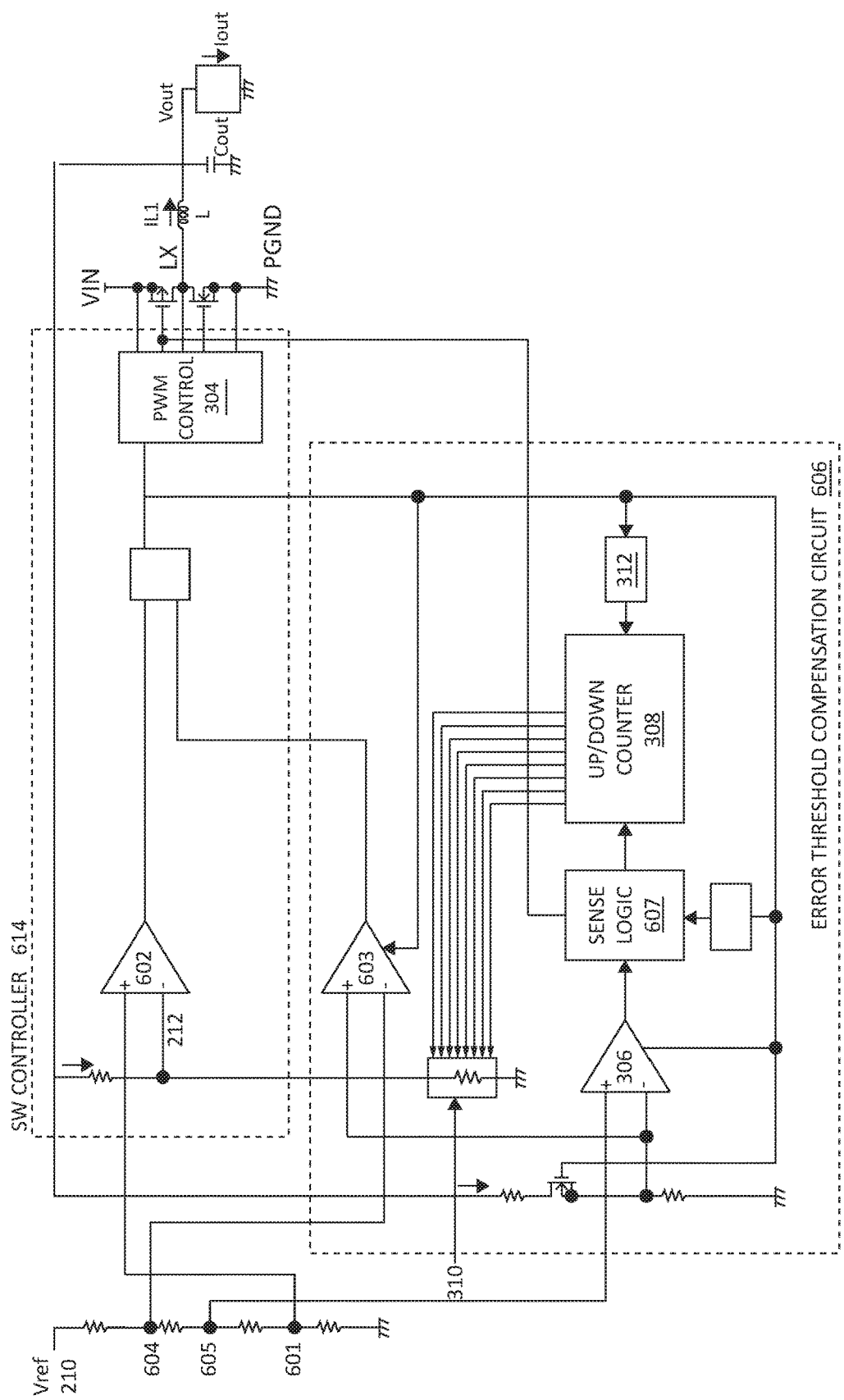
FIG. 6 is a block diagram illustrating a second embodiment of an error threshold compensation circuit of a low quiescent current DCDC converter, according to an embodiment.

FIG. 6 is a block diagram illustrating a second example embodiment of an error threshold compensation circuit 606 of a low quiescent current DCDC converter 600. In one embodiment, DCDC converter 600 may include a first comparator 602 to determine when an output voltage 608 goes below a first threshold voltage (e.g., bottom threshold voltage 601). In another embodiment, a second comparator 603 may be configured to determine when output voltage 608 goes above a second threshold voltage (e.g., peak threshold voltage 604). In another embodiment, a third comparator 306 may be configured to determine when output voltage 608 goes above a third threshold voltage (e.g., middle threshold voltage 605). Voltages 604, 605, and 601 may be determined by dividing a reference voltage 210.

In one embodiment, sense logic circuit 607 is configured to detect the middle of output voltage 608 by storing outputs of comparator 306, where each comparator output corresponds to a switching cycle performed in a current switching mode of the switching circuit 614. Sense logic circuit 607 may determine a number of switching cycles performed in the current switching mode of the switching circuit 614 and select a comparator output, from the stored comparator outputs, based on the number of switching cycles performed in the current switching mode. In one example, comparator outputs may be selected based on the following table:

| The total number of switching cycles | Judgement timing of up/down | Vsencmp Data (OUTPUT) | updown (OUTPUT) | Action |
|---|---|---|---|---|
| 1 | — | — | L | L: Down count |
| 2 | The 1st cycle of vsencmp data | L/H | L/H | L: Down count<br>H: Up count |
| 3 | The 2nd cycle of vsencmp data | L/H | L/H | L: Down count<br>H: Up count |
| 4 | The 3rd cycle of vsencmp data | L/H | L/H | L: Down count<br>H: Up count |
| 5 | The 3rd cycle of vsencmp data | L/H | L/H | L: Down count<br>H: Up count |
| 6 | The 4th cycle of vsencmp data | L/H | L/H | L: Down count<br>H: Up count |

In one embodiment, if the divided output voltage is higher than the reference voltage, the comparator outputs "L" to lower the bottom threshold voltage (e.g., the output signal of the counter transitions to "L" and the counter reduces its count to lower the bottom threshold voltage. In one embodiment, if the divided output voltage is lower than the reference voltage, the comparator outputs "H" to increase the bottom threshold voltage (e.g., the output signal of the counter transitions to "H" and the counter increase its count to increase the bottom threshold voltage. In one embodiment, if the total number of switching cycles is one, the output voltage may reach and exceed the peak voltage against the bottom threshold voltage at that time. In this embodiment, it may be advantageous to It means that it is necessary to lower the bottom threshold voltage, so the counter output will transition to "L" without the and the counter decreases its count to lower the bottom threshold voltage. Sense logic circuit 607 may further be configured to provide the selected comparator output to the up/down counter 308. In one embodiment, Up/down counter 308 may receive the output when one-shot circuit 312 is enabled.

Figure 7A:
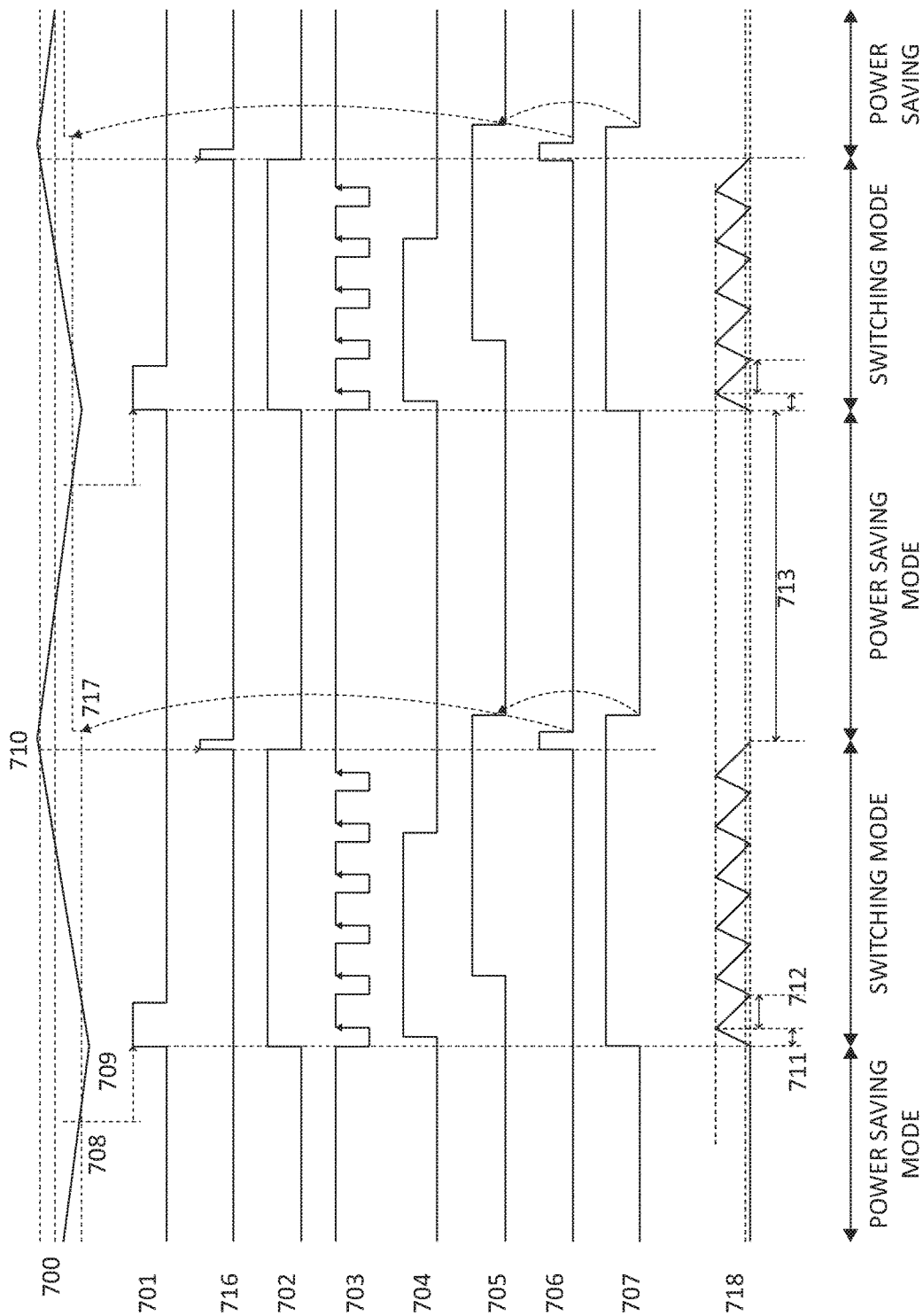
FIG. 7A is a timing diagram illustrating operation of the second embodiment of an error threshold compensation circuit of a low quiescent current DCDC converter, according to an embodiment.

FIG. 7A is a timing diagram illustrating operation of the second example embodiment of an error threshold compensation circuit of a low quiescent current DCDC converter. In one embodiment, the timing diagram of FIG. 7A corresponds to circuit 600 of FIG. 6.

In the example of FIG. 7A, output voltage 700 is detected to reach a threshold (e.g., a bottom threshold value of a comparator in a hysteresis circuit) at 708. There may be some delay 709 before the comparator sends an enable signal 701 to the switching circuit (e.g., to a PWM controller). PWM controller output 702 may reach a logical high value in response to 701 and enable a switching mode causing switches to cycle 703. In response to enabling the switching mode, the output 704 of a comparator in the error threshold compensation circuit, which may compare the target voltage to the output voltage 700, goes to a logical high if the output is below the target voltage.

After two switching cycles, sense logic signal may receive the output 704 and signal 705 an up/down counter. When a second comparator detects that the output voltage 700 exceeds an upper threshold 710, an output 716 of a one-shot circuit may go to a logical high. A logical high for output 716 may enable an up/down counter to read in the signal 705 from the comparator of the error threshold compensation circuit.

In this example, the output 705 of the error threshold compensation comparator is a logical high when the read by the up/down counter, so the up/down counter increases the threshold voltage 717. In one embodiment, the delay signal 707 may cause the output 705 to stay at a logical high for a defined time period or duration of time after output 716 goes high, to account for the delay in signal propagation through the error threshold compensation circuit of the DCDC converter. For example, delay logic may delay the operations of the sense logic circuit for a defined duration of time. Signal 718 of FIG. 7A represents current over an inductor of an LC circuit in the DCDC converter. During a first portion 711 of a switching cycle, signal 718 increases while a first switch is enabled and a second switch is disabled. During a second portion 712 of the switching cycle, signal 718 decreases while the first switch is disabled and the second switch is enabled. After a threshold number of switching cycles have been performed, current 718 remains dormant while the switching circuit is in a power saving mode.

FIG. 7B is a timing diagram illustrating operation of the second example embodiment of an error threshold compensation circuit of a low quiescent current DCDC converter. In one embodiment, the timing diagram of FIG. 7B corresponds to circuit 600 of FIG. 6. In FIG. 7B, the output 714 of the sense logic is a logical low 715 when read by the up/down counter, so the up/down counter decreases the threshold voltage for output 716.

Figure 8:
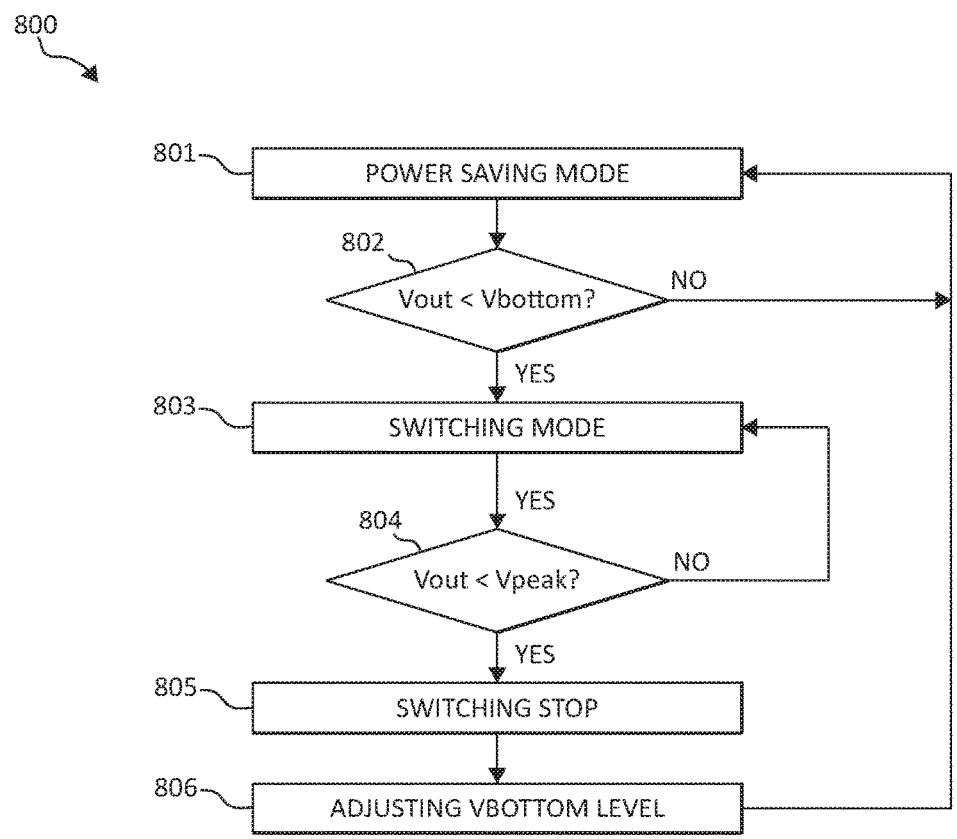
FIG. 8 is a flow diagram of processes of a low quiescent current DCDC converter, according to an embodiment.

FIG. 8 is a flow diagram of processes of a low quiescent current DCDC converter, according to an embodiment. In one embodiment, the flow diagram of FIG. 8 corresponds to circuit 600 of FIG. 6.

In one embodiment, a DCDC converter begins in a power saving mode 801. At block 802 the error threshold compensating circuit determines whether an output voltage of a DCDC converter is below a first threshold voltage (e.g., a bottom threshold voltage) of the DCDC converter. If yes, at block 803, the error threshold compensating circuit initializes a switching mode of the DCDC converter. In another embodiment, any number of switching cycles may be performed at block 803. While in the switching mode, the error threshold compensating circuit may compare 804 the output voltage to a second threshold voltage (e.g. a peak threshold voltage) of the DCDC converter and stop the switching mode 805 when the output voltage is equal to or exceeds the second threshold voltage.

The error threshold compensating circuit may modify switching mode 806 the first threshold voltage of the DCDC converter based on the comparing the output voltage to the target voltage. In one embodiment, if the output voltage is less that the target voltage, the error threshold compensating circuit increases the first threshold voltage. In another embodiment, if the output voltage is greater than or equal to the target voltage, the error threshold compensating circuit decreases the first threshold voltage. The DCDC converter may end switching mode 806 and reenter power saving mode 801.

Figure 9:
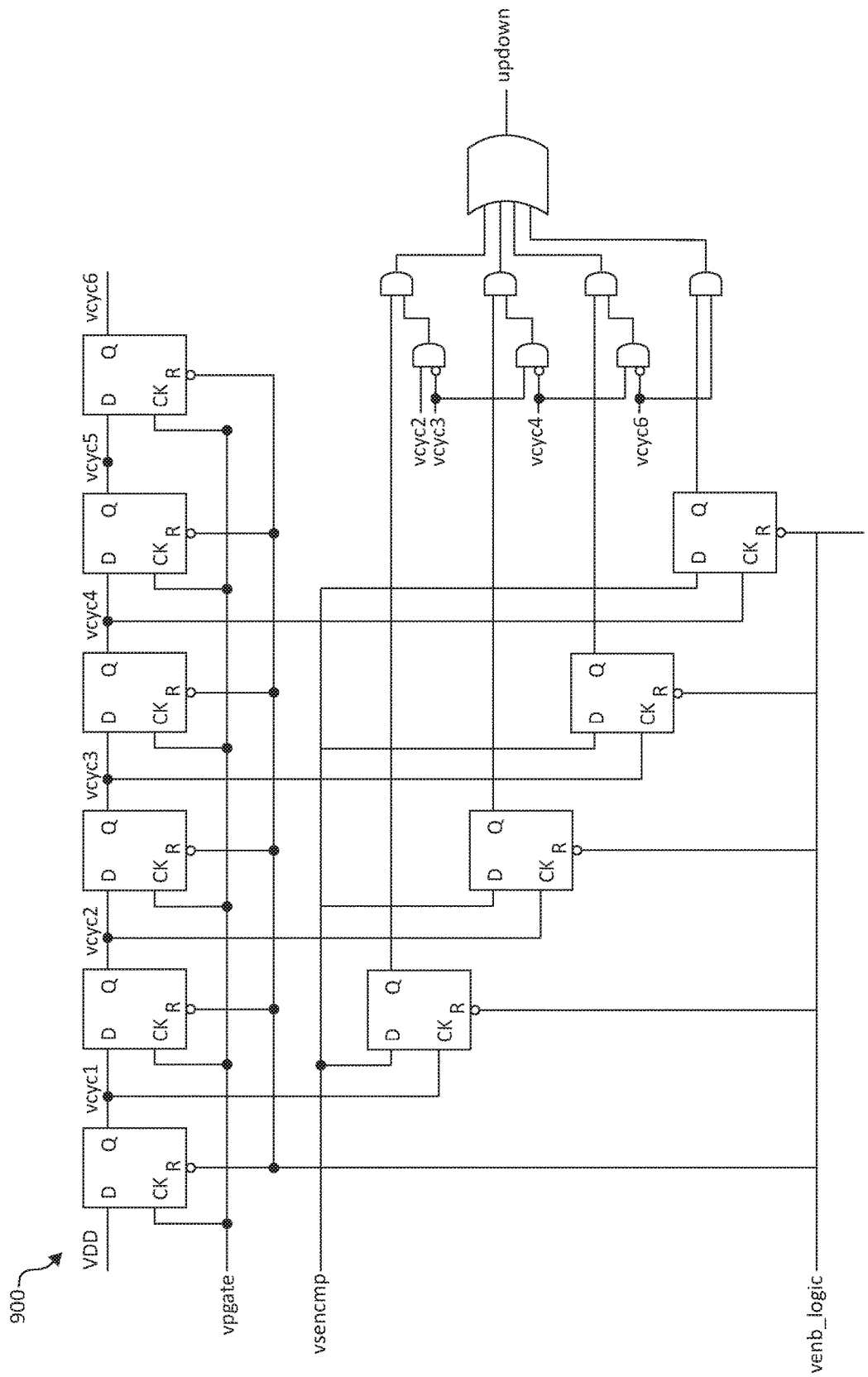
FIG. 9 is a block diagram illustrating a sense logic circuit of a low quiescent current DCDC converter, according to an embodiment.

FIG. 9 is a block diagram illustrating a sense logic circuit 900 of a low quiescent current DCDC converter, according to an embodiment. In one embodiment, sense logic circuit 900 includes various latches (e.g., d-latches) and multiplexors. In one embodiment, sense logic circuit 900 is configured detect a middle of the output voltage of a DCDC converter by storing outputs of an error threshold compensation comparator, where each comparator output corresponds to a switching cycle performed in a current switching mode of the switching circuit. Sense logic circuit 900 may determine a number of switching cycles performed in the current switching mode of the switching circuit and select a comparator output, from the stored comparator outputs, based on the number of switching cycles performed in the current switching mode. Sense logic circuit 900 may provide the comparator output to the up/down counter.

Figure 10A:
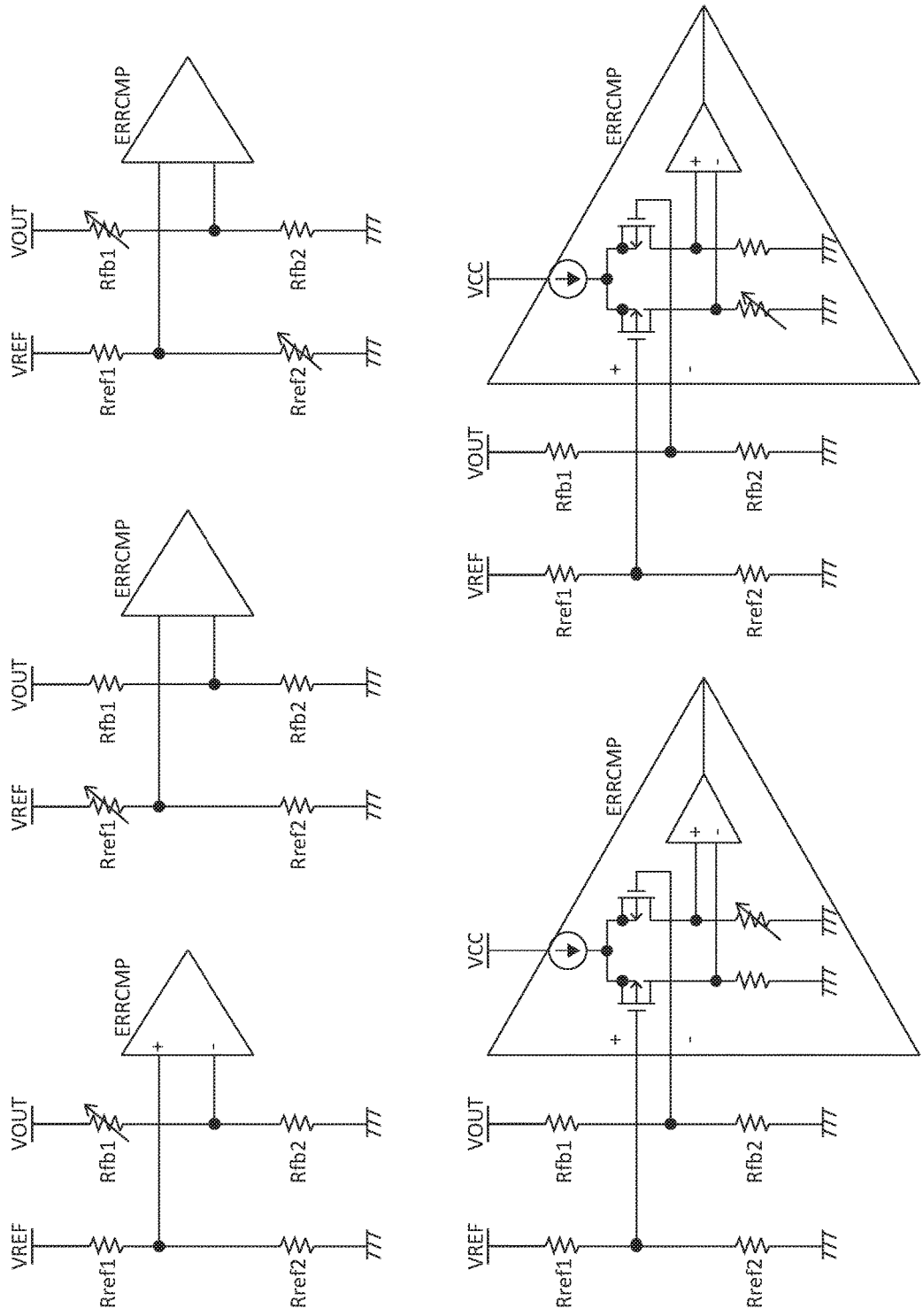
FIG. 10A is a block diagram illustrating various embodiments of threshold adjustment circuits of the error threshold compensation circuit of a low quiescent current DCDC converter, according to an embodiment.
Figure 10B:
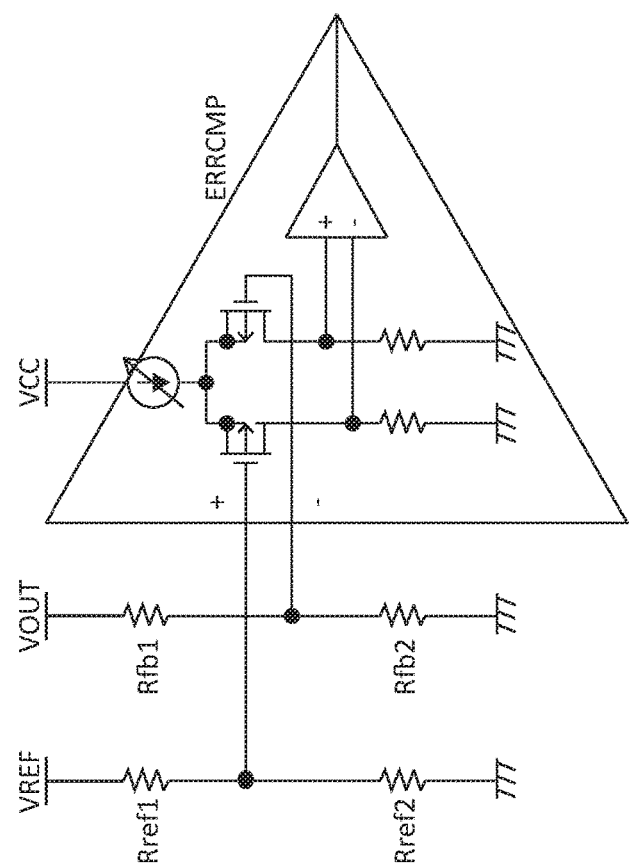
FIG. 10B is a block diagram illustrating an embodiment of a threshold adjustment circuit of an error threshold compensation circuit of a low quiescent current DCDC converter, according to an embodiment.

FIGS. 10A and 10B are a block diagram illustrating various embodiments of threshold adjustment circuits of the error threshold compensation circuit of a low quiescent current DCDC converter. In one embodiment, any of the circuits of FIGS. 10A and 10B may be utilized by the system and operations described herein to adjust a threshold voltage of the low IQ DCDC converter.

Embodiments of the present invention include various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. The terms "first," "second," "third," "fourth," etc. as used herein are meant as labels to distinguish among different elements and may not necessarily have an ordinal meaning according to their numerical designation.

The above description sets forth numerous specific details such as examples of specific systems, components, methods, and so forth, in order to provide an understanding of several embodiments of the present invention. It may be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

What is claimed is:

1. A direct current to direct current (DCDC) converter, comprising:
   a hysteresis control circuit comprising a comparator to transmit an enable signal to enable a switching mode;
   a switching circuit, operatively coupled to the hysteresis control circuit, to perform a series of switching cycles in the switching mode responsive to receiving the enable signal; and
   an error threshold compensation circuit, operatively coupled to the hysteresis control circuit and to the switching circuit, wherein the error threshold compensation circuit is configured to:
      detect an output voltage of the DCDC converter subsequent to completion of a subset of the series of switching cycles and prior to completion of the series of switching cycles of the switching mode;
      compare the output voltage to a target voltage;
      modify a bottom threshold voltage based on a comparison of the output voltage to the target voltage; and
      output the bottom threshold voltage to the comparator of the hysteresis control circuit to lower a quiescent current (IQ) of the DCDC converter, wherein the DCDC converter is to enter a power saving mode subsequent to the completion of the series of switching cycles of the switching mode.

2. The DCDC converter of claim 1, wherein to modify the bottom threshold voltage, the error threshold compensation circuit is configured to:
increase the bottom threshold voltage in response to the output voltage being less than the target voltage based on the comparison; and
decrease the bottom threshold voltage in response to the output voltage being greater than or equal to the target voltage based on the comparison.

3. The DCDC converter of claim 1, wherein the error threshold compensation circuit is configured to compare the output voltage to the target voltage after at least two consecutive switching cycles are performed in the switching mode of the switching circuit.

4. The DCDC converter of claim 1, further comprising a filter circuit operatively coupled to the switching circuit, the hysteresis control circuit, and the error threshold compensation circuit, wherein the filter circuit is configured to store energy in the DCDC converter and filter noise from the output voltage.

5. The DCDC converter of claim 1, wherein the error threshold compensation circuit comprises:
a first comparator, operatively coupled to the switching circuit and the hysteresis control circuit, wherein the first comparator is configured to compare the output voltage to the target voltage to generate a first comparator output during the switching mode of the switching circuit; and
a counter, operatively coupled to the first comparator, the switching circuit, and the hysteresis control circuit, wherein the counter is configured to modify the bottom threshold voltage based on the first comparator output.

6. The DCDC converter of claim 5, wherein the error threshold compensation circuit further comprises:
a one-shot circuit, operatively coupled to the switching circuit and the counter, wherein the one-shot circuit is configured to enable the counter to receive the first comparator output; and
a trimming circuit, operatively coupled to the counter and the hysteresis control circuit, wherein to modify the bottom threshold voltage, the counter is configured to modify the trimming circuit.

7. The DCDC converter of claim 6, wherein the error threshold compensation circuit further comprises:
a second comparator, operatively coupled to the switching circuit and the hysteresis control circuit, wherein the second comparator is configured to compare the output voltage to a second threshold voltage to generate a second comparator output voltage; and
a sense logic circuit, operatively coupled to the first comparator and the counter, wherein the sense logic circuit is configured to:
store a plurality of first comparator outputs, wherein each first comparator output of the plurality of first comparator outputs corresponds to a respective switching cycle performed in a current switching mode of the switching circuit;
determine a number of switching cycles performed in the current switching mode of the switching circuit;
select the first comparator output, from the plurality of first comparator outputs, based on the number of switching cycles performed in the current switching mode; and
provide the first comparator output to the counter.

8. The DCDC converter of claim 7, wherein the error threshold compensation circuit further comprises delay logic, operatively coupled to the sense logic circuit, wherein the delay logic is to delay the operations of the sense logic circuit for a defined duration of time.

9. A system, comprising:
a voltage source; and
a direct current to direct current (DCDC) converter, operatively coupled to the voltage source, comprising:
a hysteresis control circuit comprising a comparator to transmit an enable signal to enable a switching mode;
a switching circuit, operatively coupled to the hysteresis control circuit, to perform a series of switching cycles in the switching mode responsive to receiving the enable signal; and
an error threshold compensation circuit, operatively coupled to the hysteresis control circuit and to the switching circuit, wherein the error threshold compensation circuit is configured to:
detect an output voltage of the DCDC converter subsequent to completion of a subset of the series of switching cycles and prior to completion of the series of switching cycles of the switching mode;
compare the output voltage to a target voltage;
modify a bottom threshold voltage based on a comparison of the output voltage to the target voltage; and
output the bottom threshold voltage to the comparator of the hysteresis control circuit to lower a quiescent current (IQ) of the DCDC converter, wherein the DCDC converter is to enter a power saving mode subsequent to the completion of the series of switching cycles of the switching mode.

10. The system of claim 9, further comprising a processing device operatively coupled to the DCDC converter.

11. The system of claim 9, wherein to modify the bottom threshold voltage, the error threshold compensation circuit is configured to:
increase the bottom threshold voltage in response to the output voltage being less than the target voltage based on the comparison; and
decrease the bottom threshold voltage in response to the output voltage being greater than or equal to the target voltage based on the comparison.

12. The system of claim 9, wherein the error threshold compensation circuit is configured to compare the output voltage to the target voltage after at least two consecutive switching cycles are performed in the switching mode of the switching circuit.

13. The system of claim 9, wherein the DCDC converter further comprises a filter circuit operatively coupled to the switching circuit, the hysteresis control circuit, and the error threshold compensation circuit, wherein the filter circuit is configured to store energy in the DCDC converter and filter noise from the output voltage.

14. The system of claim 9, wherein the error threshold compensation circuit comprises:
a first comparator, operatively coupled to the switching circuit and the hysteresis control circuit, wherein the first comparator is configured to compare the output voltage to the target voltage to generate a first comparator output during the switching mode of the switching circuit; and
a counter, operatively coupled to the first comparator, the switching circuit, and the hysteresis control circuit, wherein the counter is configured to modify the bottom threshold voltage based on the first comparator output.

15. The system of claim 14, wherein the error threshold compensation circuit further comprises:

a one-shot circuit, operatively coupled to the switching circuit and the counter, wherein the one-shot circuit is configured to enable the counter to receive the first comparator output; and a trimming circuit, operatively coupled to the counter and the hysteresis control circuit, wherein to modify the bottom threshold voltage the counter is configured to modify the trimming circuit.

16. A method, comprising:

responsive to determining that an output voltage of a direct current to direct current (DCDC) converter is below a bottom threshold voltage, transmitting an enable signal to enable a switching mode of the DCDC converter;

initializing a series of switching cycles in the switching mode of the DCDC converter;

comparing the output voltage subsequent to completion of a subset of the series of switching cycles and prior to completion of the series of switching cycles of the switching mode to a target voltage of the DCDC converter;

modifying the bottom threshold voltage based on the comparing of the output voltage to the target voltage;

outputting the bottom threshold voltage to a comparator of a hysteresis control circuit of the DCDC converter to lower a quiescent current (K)) of the DCDC converter; and entering a power saving mode subsequent to the completion of the series of switching cycles of the switching mode.

17. The method of claim 16, wherein modifying the bottom threshold voltage comprises:

in response to the output voltage being less that the target voltage, increasing the bottom threshold voltage; and in response to the output voltage being greater than or equal to the target voltage, decreasing the bottom threshold voltage.

18. The method of claim 16, further comprising:

determining that at least four switching cycles in the switching mode of the switching mode of the DCDC converter have been performed; and suspending the switching mode.

19. The method of claim 16, further comprising:

storing energy in the DCDC converter corresponding to the output voltage; and filtering noise from the output voltage.

20. The method of claim 16, wherein modifying the bottom threshold voltage comprises modifying a trimming circuit of the DCDC converter based on the comparing the output voltage to the target voltage.

* * * * *